(12) United States Patent
Shitama et al.

(10) Patent No.: US 7,480,274 B2
(45) Date of Patent: Jan. 20, 2009

(54) DATA FORWARDING CONTROLLER COMMUNICATION TERMINAL APPARATUS, DATA COMMUNICATION SYSTEM AND METHOD, AND COMPUTER PROGRAM

(75) Inventors: Kazuhiro Shitama, Chiba (JP); Kuniaki Kurihara, Tokyo (JP)

(73) Assignee: Sony Corporation, Tokyo (JP)

( * ) Notice: Subject to any disclaimer, the term of this patent is extended or adjusted under 35 U.S.C. 154(b) by 1056 days.

(21) Appl. No.: 10/612,927

(22) Filed: Jul. 7, 2003

(65) Prior Publication Data

US 2004/0064581 A1    Apr. 1, 2004

(30) Foreign Application Priority Data

Jul. 11, 2002    (JP)    ............................. 2002-202461

(51) Int. Cl.
*H04Q 7/00*    (2006.01)
(52) U.S. Cl. ...................... 370/331; 370/338; 370/346; 370/350
(58) Field of Classification Search .............. 370/351, 370/401, 255, 353, 397, 220
See application file for complete search history.

(56) References Cited

U.S. PATENT DOCUMENTS 6,101,188 A * 8/2000 Sekine et al. ............... 370/401
2003/0235175 A1* 12/2003 Naghian et al. ............. 370/338

FOREIGN PATENT DOCUMENTS

JP    10-93614    4/1998

* cited by examiner

*Primary Examiner*—Seema S. Rao
*Assistant Examiner*—Wanda Z Russell
(74) *Attorney, Agent, or Firm*—Oblon, Spivak, McClelland, Maier & Neustadt, P.C.

(57) ABSTRACT

An apparatus and method that being capable of implementing uninterrupted communication during performing a handover process by a mobile node are provided. A mobile node transmits a handover start message containing address information of a destination access point, to a switch as a data forwarding controller, and the switch adds an entry to a MAC learning table based on the address contained in the message. The switch forwards packets addressed to the mobile node to a current access point of the mobile node as well as to its destination access point in parallel based on the entries in the MAC learning table. The mobile node can receive data packets at once upon connection to the new access point after having performed a handover.

19 Claims, 12 Drawing Sheets

FIG. 2

| MAC ADDRESS | OUTPUT PORT |
|---|---|
| AWM1 | P1 |
| AWM2 | P2 |

FIG. 3

| MAC ADDRESS | OUTPUT PORT |
|---|---|
| MNM | P1 |

FIG. 5

| MAC ADDRESS | OUTPUT PORT |
|---|---|
| MNM | P2 |

FIG. 6

| MAC ADDRESS | OUTPUT PORT |
|---|---|
| MNM | P1 |
| MNM | P2 |

FIG. 9A

| MAC ADDRESS | OUTPUT PORT |
|---|---|
| 00:01:02:83:04:86 | 1 |

FIG. 9B

| MAC ADDRESS | OUTPUT PORT |
|---|---|
| 00:01:02:83:04:86 | 1 |
| 00:01:02:83:04:86 | 2 |

FIG. 9C

| MAC ADDRESS | OUTPUT PORT |
|---|---|
| 00:01:02:83:04:86 | 2 |

DATA FORWARDING CONTROLLER COMMUNICATION TERMINAL APPARATUS, DATA COMMUNICATION SYSTEM AND METHOD, AND COMPUTER PROGRAM

CROSS REFERENCE TO RELATED APPLICATIONS

The present document is based on Japanese Priority Document JP 2002-202461, filed in the Japanese Patent Office on Jul. 11, 2002, the entire contents of which are incorporated herein by reference to the extent permitted by law.

BACKGROUND OF THE INVENTION

1. Field of the Invention

The present invention relates to a data forwarding controller, communication terminal apparatus, data communication system and method, and computer program, and more particularly to a data forwarding controller, communication terminal apparatus, data communication system and method, and computer program that are capable of implementing uninterrupted communication even when a mobile communication terminal (mobile node) moves between access points.

2. Description of Related Art

Data forwarding is actively performed using various networks. Data communication is carried out among diverse information processing equipment and communication equipment, such as PCs, workstations, PDAs (Personal Digital Assistants), and portable terminals, through their networking. For example, a suite of protocols TCP/IP (Transmission Control Protocol/Internet Protocol) is among typical protocols implementing their networking and communication. The TCP/IP protocol can identify a communication terminal on a network using an IP address, which is a logical address. Also, a MAC (Media Access Control) address (Ethernet address) that identifies each information processing apparatus or communication terminal itself ensures the uniqueness of each information processing apparatus within a network, permitting communication of data packets (or frames) over the network among terminals.

The MAC address, administered by IEEE (The Institute of Electrical and Electronics Engineers, Inc.), consists of a total of 6 bytes, 3 bytes of which are allocated to a hardware manufacturer and 3 bytes to an apparatus, and is set as an address specific to the apparatus.

A switch (an Ethernet switch or a LAN switch) is used as an apparatus that relays data forwarding via a network by reference to MAC addresses. The switch performs processing corresponding to a data link layer of the OSI (Open Systems Interconnection) reference model to identify a MAC address as a destination address for packets and relays the packets to that MAC address.

A hub used conventionally as a relay apparatus performs processing at a physical layer level of the OSI reference model for transmission of packets to all nodes connected thereto, whereas the switch identifies a MAC address to relay packets only to the destination MAC address as mentioned above, whereby the switch can reduce traffic of packets in the network and implements efficient packet relaying.

Unlike the hub that constantly floods received packets, for example, ethernet frames to all ports, the switch is arranged, through its associating a source MAC address of received packets with a receiving port (i.e., through its learning), to thereafter forward the packets only to the associated port when receiving the packets addressed to that MAC address. A set of entries each associating a MAC address with an (output) port is called a MAC learning table. This MAC learning table allows received packets to be forwarded only to a minimum number of ports, whereby the switch can accomplish a higher throughput than the hub. Note that when receiving packets addressed to a MAC address not registered in the MAC learning table, the switch floods the packets to all ports like the hub.

In addition, the switch manages entries in its MAC learning table usually in soft state. As to an entry associating a port with a MAC address, unless the switch receives an ethernet frame having the same MAC address as a source address from the same port as the associated port for a predetermined time (usually, 5 minutes) or more, it will delete that entry. Furthermore, if received from a port different from the associated port, the switch changes the output port associated with the MAC address immediately. In other words, when the switch registers an entry as to a MAC address in its MAC learning table, unless a node having that MAC address sends a packet to the switch explicitly, the switch does not delete that entry as to the MAC address, from its MAC learning table until a predetermined time elapses.

Such behavior of the switch would impose a serious problem when a terminal transmitting and receiving packets moves, i.e., upon a mobile node. For example, let it be assumed that a mobile node moves between access points downlinked from a switch (i.e., performs handover). In the interest of brevity, an IP subnet is supposed to remain unchanged even if the mobile node moves between these access points.

In a situation, first, the mobile node connects to one of the access points to communicate with a node on the Internet, and as a result, the switch creates an entry as to the MAC address of that mobile node in its MAC learning table. Under this situation, when the mobile node moves to the other access point, the registered entry as to the MAC address of the mobile node still resides in the MAC leaning table of the switch; i.e., that entry is not deleted only by the mobile node having merely performed handover. Thus, when the switch receives data packets addressed to the mobile node, the switch erroneously forwards the data packets to the access point to which the mobile node was connected before its movement (until the switch deletes the entry as to the MAC address of that mobile node after the passage of a predetermined time).

In another situation where the mobile node is receiving streaming video before a handover (the mobile node is only receiving, not transmitting data) and wishes to continuously receive the streaming video after the handover, an entry as to the mobile node in the MAC learning table of the switch still remains as having the MAC address of the mobile node associated with the port to which the access point before the movement is connected. Thus, the Ethernet switch forwards data packets of the streaming video to the access point before the movement according to the erroneous old entry (until the switch deletes that old entry after the passage of a predetermined time).

The above-mentioned communication error problem over a mobile node moving from one access point to another is caused by the fact that the old entry before the movement remains undeleted in the switch from which the access point before the movement is downlinked. This problem can be solved to some extent if the mobile node sends some sort of movement notification message to the Ethernet switch immediately after a handover. A configuration of this message-sending scheme is disclosed in Japanese Patent Application Publication No. 2000-341339 as related art.

In the scheme disclosed in Japanese Patent Application Publication No. 2000-341339, a mobile node broadcasts a special Address Resolution Protocol (ARP as defined in RFC826) packet, thereby causing an uplinked switch (an Ethernet switch) to update an entry as to the mobile node in its MAC learning table.

This scheme proposed in Japanese Patent Application Publication No. 2000-341339 enables the switch as the packet relay apparatus to keep the entry as to the MAC address of the mobile node updated, even when the mobile node moves (i.e., performs handover) between the access points downlinked from the switch.

However, this scheme disclosed in JP2000-341339A could not support sufficiently high-speed handovers, because this scheme requires that: the node broadcast an ARP packet after its movement; access points forward the broadcast packet; the switch receive the forwarded packet; and the switch then update its MAC learning table based on the ARP packet. These plurality of processes must also be sequentially performed. Thus, during these processes, the switch leaves the entry as to the MAC address of the mobile node unupdated, thereby resulting in the switch forwarding its received data packets addressed to the mobile node to the old access point to which the mobile node was connected before its movement.

SUMMARY OF THE INVENTION

It would be desirable for a mobile node that moves between access points (i.e., performs handover) while receiving streaming video or the like, to receive the streaming video at once upon establishment of its connection to a new access point.

In order to satisfy the above and other needs, the present invention provides a data forwarding controller, communication terminal apparatus, data communication system and method, and computer program that are capable of implementing sufficiently high-speed handovers, and relay packets to a correct node through smooth relaying even when the mobile node moves from one access point to another at a high speed.

The present invention is intended to propose a novel scheme to support mobile nodes for their high-speed handovers, whereby even if a mobile node performs handover while receiving streaming video or the like, it can receive the streaming video at once upon establishment of its connection to a new access point.

A first aspect of the present invention provides a data forwarding controller for performing data forwarding control via a network, which includes: a plurality of data input/output ports; means for storing a MAC learning table in which a MAC address of data for forwarding is associated with an output port; and a control section for updating the MAC learning table. The control section is configured to set, for a mobile node, in the MAC learning table, a plurality of entries associating different output ports with a MAC address of the mobile node, and output data addressed to the MAC address of the mobile node received via the network, to the plurality of output ports in parallel, based on the plurality of entries set in the MAC learning table.

In an embodiment of the data forwarding controller of the present invention, the control section is configured to set a plurality of entries respectively setting a port to which a current access point of the mobile node is connected and port(s) to which one or more next access points of the mobile node is connected, as output ports corresponding to the MAC address of the mobile node, and output the data addressed to the MAC address of the mobile node received via the network, to the plurality of output ports set in the plurality of entries in parallel.

In another embodiment of the data forwarding controller of the present invention, the control section is configured to set an entry in the MAC learning table as an additional entry based on a MAC address of a next access point contained in a handover start message received from the mobile node, the additional entry setting a port to which the next access point is connected, as an output port corresponding to the MAC address of the mobile node. The control section is also configured to output the data addressed to the MAC address of the mobile node received via the network, in parallel to the output ports listed in the plurality of entries as to the MAC address of the mobile node set in the MAC learning table, the output ports being a plurality of ports to which a current access point and the next access point of the mobile node are connected.

In still another embodiment of the data forwarding controller of the present invention, the control section is configured to transmit a handover setting completion message to the mobile node from which the handover start message is received, on condition that the setting of the additional entry in the MAC learning table based on the handover start message is completed.

In yet another embodiment of the data forwarding controller of the present invention, the control section is configured to delete, based on a MAC address of an old access point contained in a handover end message received from the mobile node, an entry setting a port to which the old access point is connected, as an output port corresponding to the MAC address of the mobile node, from the MAC learning table.

In even another embodiment of the data forwarding controller of the present invention, the control section is configured to receive data from access points performing data forwarding to the mobile node, and set an entry in MAC learning table corresponding to output ports for MAC addresses of the access points, based on the data.

A second aspect of the present invention provides a communication terminal apparatus of a mobile type which performs data transmission/reception via a network and which changes access points based on data receiving conditions. The communication terminal apparatus is configured to acquire a MAC address of a next access point to which the communication terminal apparatus is scheduled to be connected next, and broadcast a handover start message containing the acquired MAC address of the next access point, and perform a handover process on condition that the communication terminal apparatus receives a handover setting completion message from a data forwarding controller as a response to the handover start message.

In an embodiment of the communication terminal apparatus of the present invention, the communication terminal apparatus is configured to perform a background scanning process by which all wireless channels are periodically scanned, to acquire and store a source MAC address of a received beacon as the MAC address of the next access point.

In another embodiment of the communication terminal apparatus of the present invention, the communication terminal apparatus is configured to re-transmit the handover start message for a time period from transmission of the handover start message to reception of the handover setting completion message.

In still another embodiment of the communication terminal apparatus of the present invention, the communication terminal apparatus is configured to transmit to the data forwarding controller from which the handover setting completion message is received or broadcast, a handover end message containing a MAC address of an old access point which the communication terminal apparatus has disconnected, after the handover process has been performed.

A third aspect of the present invention provides a data communication system including a communication terminal apparatus of a mobile type which performs data transmission/reception via a network and which changes access points based on data receiving conditions, and a data forwarding controller which performs data forwarding control via the network. The communication terminal apparatus is configured to acquire a MAC address of a next access point to which the communication terminal apparatus is scheduled to be connected next, and broadcast a handover start message containing the acquired MAC address of the next access point. The data forwarding controller is configured to set an entry in a MAC learning table as an additional entry based on the MAC address of the next access point contained in the handover start message received from the communication terminal apparatus, the additional entry setting a port to which the next access point is connected, as an output port corresponding to a MAC address of the communication terminal apparatus. The data forwarding controller is also configured to output data addressed to the MAC address of the communication terminal apparatus received via the network, in parallel to output ports listed in a plurality of entries as to the MAC address of the communication terminal apparatus set in the MAC learning table, the output ports being a plurality of ports to which a current access point and the next access point of the communication terminal apparatus are connected.

In an embodiment of the data communication system of the present invention, the communication terminal apparatus is configured to perform a handover process on condition that the communication terminal apparatus receives a handover setting completion message from the data forwarding controller as a response to the handover start message.

In another embodiment of the data communication system of the present invention, the data forwarding controller is configured to transmit a handover setting completion message to the communication terminal apparatus from which the handover start message is received, on condition that the setting of the additional entry in the MAC learning table based on the handover start message is completed.

In still another embodiment of the data communication system of the present invention, the data forwarding controller is configured to delete, based on a MAC address of an old access point contained in a handover end message received from the communication terminal apparatus, an entry setting a port to which the old access point is connected, as an output port corresponding to the MAC address of the communication terminal apparatus, from the MAC learning table.

A fourth aspect of the present invention provides a method of controlling data forwarding via a network, which includes the steps of: setting, for a mobile node, in a MAC learning table in which a MAC address of data for forwarding is associated with an output port, a plurality of entries associating different output ports with a MAC address of the mobile node; and outputting data addressed to the MAC address of the mobile node received via the network, to the plurality of output ports in parallel based on the plurality of entries set in the MAC learning table.

In another embodiment of the method of the present invention, the step of setting a plurality of entries includes setting the plurality of entries respectively setting a port to which a current access point of the mobile node is connected and port(s) to which one or more next access points of the mobile node is connected, as output ports corresponding to the MAC address of the mobile node; and the step of outputting data includes outputting the data addressed to the MAC address of the mobile node received via the network, to the plurality of output ports set in the plurality of entries in parallel.

In still another embodiment of the method of the present invention, the step of setting a plurality of entries includes setting an entry in the MAC learning table as an additional entry based on the MAC address of a next access point contained in a handover start message received from the mobile node, the additional entry setting a port to which the next access point is connected, as an output port corresponding to the MAC address of the mobile node; and the step of outputting data includes outputting the data addressed to the MAC address of the mobile node received via the network, in parallel to the output ports listed in the plurality of entries as to the MAC address of the mobile node set in the MAC learning table, the output ports being a plurality of ports to which a current access point and the next access point of the mobile node are connected.

In still another embodiment of the method of the present invention, the method further includes the step of transmitting a handover setting completion message to the mobile node from which the handover start message is received, on condition that the setting of the additional entry in the MAC learning table based on the handover start message is completed.

In yet another embodiment of the method of the present invention, the method further includes the step of deleting, based on a MAC address of an old access point contained in a handover end message received from the mobile node, an entry setting a port to which the old access point is connected, as an output port corresponding to the MAC address of the mobile node, from the MAC learning table.

In even another embodiment of the method of the present invention, the method further includes the step of receiving data from access points performing data forwarding to the mobile node, and setting an entry corresponding to output ports for MAC addresses of the access points in the MAC learning table, based on the data.

A fifth aspect of the present invention provides a method of performing a handover process on a communication terminal apparatus of a mobile type which performs data transmission/reception via a network and which changes access points based on data receiving conditions. The method includes the steps of: acquiring a MAC address of a next access point to which the communication terminal apparatus is scheduled to be connected next; broadcasting a handover start message containing the acquired MAC address of the next access point; and performing the handover process on condition that a handover setting completion message is received from a data forwarding controller as a response to the handover start message.

In an embodiment of the method of the present invention, the step of acquiring a MAC address includes performing a background scanning process by which all wireless channels are periodically scanned, to acquire and store a source MAC address of a received beacon as the MAC address of the next access point.

In another embodiment of the method of the present invention, the method further includes the step of re-transmitting the handover start message for a time period from transmission of the handover start message to reception of the handover setting completion message.

In still another embodiment of the method of the present invention, the method further includes the step of transmitting to the data forwarding controller from which the handover setting completion message is received or broadcasting, a handover end message containing a MAC address of an old access point which the communication terminal apparatus has disconnected, after the handover process has been performed.

A sixth aspect of the present invention provides a data communication method including a communication terminal apparatus of a mobile type which performs data transmission/reception via a network and which changes access points based on data receiving conditions, and a data forwarding controller which performs data forwarding control via the network. The communication terminal apparatus acquires a MAC address of a next access point to which the communication terminal apparatus is scheduled to be connected next, and broadcasts a handover start message containing the MAC address of the acquired next access point. The data forwarding controller sets an entry in a MAC learning table as an additional entry based on the MAC address of the next access point contained in the handover start message received from the communication terminal apparatus, the additional entry setting a port to which the next access point is connected, as an output port corresponding to a MAC address of the communication terminal apparatus. The data forwarding controller also outputs data addressed to the MAC address of the communication terminal apparatus received via the network, in parallel to output ports listed in a plurality of entries as to the MAC address of the communication terminal apparatus set in the MAC learning table, the output ports being a plurality of ports to which a current access point and the next access point of the communication terminal apparatus are connected.

In an embodiment of the data communication method of the present invention, the communication terminal apparatus further performs a handover process on condition that the communication terminal apparatus receives a handover setting completion message from the data forwarding controller as a response to the handover start message.

In another embodiment of the data communication method of the present invention, the data forwarding controller further transmits a handover setting completion message to the communication terminal apparatus from which the handover start message is received, on condition that the setting of the additional entry in the MAC learning table based on the handover start message is completed.

In still another embodiment of the data communication method of the present invention, the data forwarding controller further deletes, based on a MAC address of an old access point contained in a handover end message received from the communication terminal apparatus, an entry setting a port to which the old access point is connected, as an output port corresponding to the MAC address of the communication terminal apparatus, from the MAC learning table.

A seventh aspect of the present invention provides a computer program described for executing a data forwarding control process via a network on a computer system. The computer program comprises the steps of: setting, for a mobile node, in a MAC learning table in which a MAC address of data for forwarding is associated with an output port, a plurality of entries associating different output ports with a MAC address of the mobile node; and outputting data addressed to the MAC address of the mobile node received via the network, to the plurality of output ports in parallel based on the plurality of entries set in the MAC learning table.

An eighth aspect of the present invention provides a computer program described for executing on a handover process a computer system performed by a communication terminal apparatus of a mobile type which performs data transmission/reception via a network and which changes access points based on data receiving conditions. The computer program includes the steps of: acquiring a MAC address of a next access point to which the communication terminal apparatus is scheduled to be connected next; broadcasting a handover start message containing the acquired MAC address of the next access point; and performing the handover process on condition that a handover setting completion message is received from a data forwarding controller as a response to the handover start message.

According to the configuration of the present invention, the mobile node as the communication terminal apparatus transmits a handover start message containing address information of a destination access point to the switch as the data forwarding controller, and the switch adds an entry to the MAC learning table based on the address contained in the message, and also forwards packets addressed to the mobile node, to a current access point of the mobile node as well as to its destination access point in parallel based on the entries in the MAC learning table, whereby the mobile node can receive data packets at once upon connection to the new access point after having performed a handover and thus high-speed handovers can be supported.

Furthermore, according to the present invention, the mobile node as the communication terminal apparatus transmits, after the handover, a handover end message to the switch as the data forwarding controller, and the switch releases its bi-cast setting, i.e., deletes the old entry in the MAC learning table, whereby forwarding of the data packets addressed to the mobile node to the access point to which the mobile node was connected before its movement is stopped, and thus wasteful traffic on the network can be reduced to improve data forwarding efficiency and traffic.

Note that the computer program of the present invention is a program that can be provided, to general-purpose computers capable of executing various program codes, in a computer readable form by recording media and communication media including, for example, CDs (Compact Discs), FDs, and MO (Magneto-Optical) discs as the recording media, or networks as the communication media. By providing such program in a computer-readable fashion, processing according to the program is accomplished on the computer system.

The above and other objects, features and advantages of the present invention will become more apparent from the following detailed description of the presently exemplary preferred embodiment of the present invention and accompanying drawings. Note that the term "system" used herein includes configurations in which a plurality of apparatuses are logically grouped, and is not limited to configurations in which these apparatuses are within the same housing.

BRIEF DESCRIPTION OF THE DRAWINGS

FIG. 2 is a diagram illustrating entries in a MAC learning table held by a switch;

FIG. 3 is a diagram illustrating an entry for a mobile node (MN) in the MAC learning table held by the switch;

FIG. 5 is a diagram illustrating an entry in the MAC learning table held by the switch, after completion of a handover by the mobile node (MN);

FIG. 6 is a diagram illustrating entries in the MAC learning table held by the switch, during bi-casting to the mobile node (MN);

FIGS. 9A to 9C are diagrams illustrating a transition of entries for the mobile node (MN) in the MAC learning table held by the switch;

DESCRIPTION OF THE PREFERRED EMBODIMENTS

Figure 1:
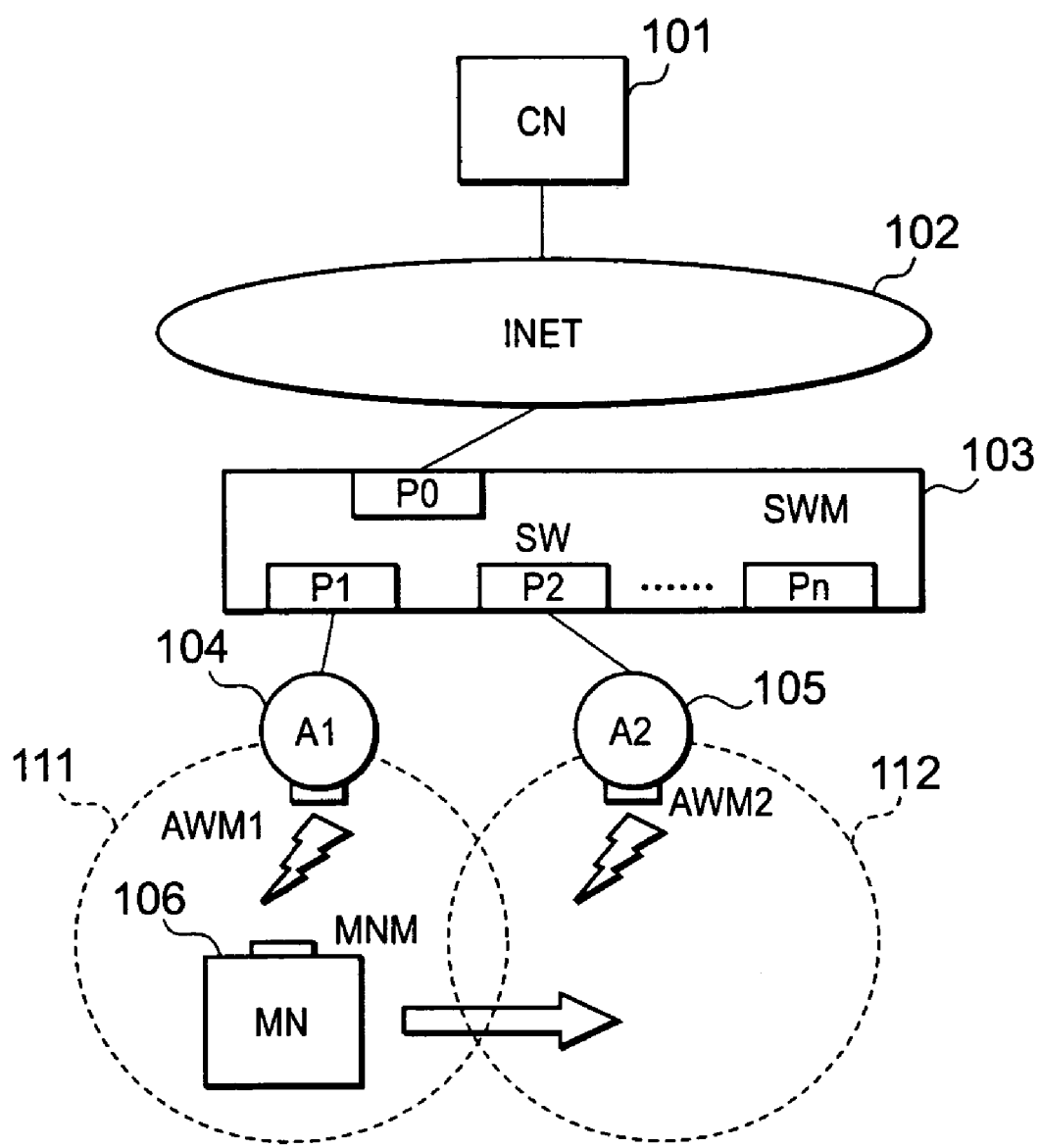
FIG. 1 is a diagram showing an exemplary network configuration in which processes to which a configuration of the present invention is applied are executable.

Hereinafter, the configuration of the present invention will be described in detail by referring to the drawings. Referring now to FIG. 1, an exemplary configuration of a communication network to which the present invention is applicable will be described. In a configuration for communication among nodes via a communication network 102 such as the Internet, a correspondent node (CN) 101 as a communication terminal apparatus communicates with a mobile node (MN) 106.

A switch (Ethernet switch) 103 as a data forwarding controller performs processing corresponding to the data link layer of the OSI reference model. That is, the switch 103 performs switching by reference to a MAC address of a data packet (ethernet frame) to be relayed, and based on a MAC learning table (see FIG. 2) where MAC addresses are associated with output ports, determines an output port, to relay the packet.

The switch 103 as the data forwarding controller shown in FIG. 1 has a configuration in which ports P1 and P2 downlinked therefrom are connected to corresponding access points A1 104 and A2 105 thereof, respectively. The MAC address of the switch 103 is [SWM].

The access points A1 104 and A2 105 each perform data (packet) forwarding during communication by a node staying in a predetermined access area. In FIG. 1, the access point A1 104 performs a data (packet) forwarding process for communication by a communication node present within an access area 111, and the access point A2 105 does the same for a node present within an access area 112.

The access points A1 104 and A2 105 have wireless interface-side MAC addresses [AWM1] and [AWM2], respectively. Each of the access points A1 104 and A2 105 periodically transmits to the switch 103 an arbitrary ethernet frame having its wireless interface-side MAC address as a source address.

The switch 103 updates the MAC learning table upon receipt of the frames, whereby it creates entries such as shown in FIG. 2 in its MAC learning table. Note that the switch 103 is a node connected to an uplinked network (the Internet: INET) 102 via an uplinked port P0, and that the correspondent node (CN) 101 is connected to the network (INET) 102.

In the above configuration, during communication between the correspondent node (CN) 101 and the mobile node (MN) 106, if the mobile node (MN) 106 moves from the access area 111 to the access area 112, then switching between the access points is needed as a result of this movement; i.e., the access point A1 104 must be switched to the access point A2 105.

In a conventional system, the switch 103, until its completion of updating the MAC learning table, relays packets based on the still unupdated MAC learning table even after the mobile node (MN) 106 has moved in to the access area 112, thereby inconveniently outputting the packets to be relayed, to the access point A1 104 corresponding to the access area 111 where the mobile node (MN) 106 no longer stays. As a result, the mobile mode (MN) 106 now staying in the access area 112 fails to receive the relayed data frames (packets) until the updating of the table is completed. For example, in stream-distribution of music, images or the like, the music or the images are interrupted during this updating period.

In the configuration of the present invention, a process is performed, by which before a mobile node moves from one access point to another, i.e., before it performs handover, the switch (e.g., Ethernet switch) 103 as the relay apparatus is caused to forward data packets addressed to the mobile node also to a destination access point beforehand. This process will hereinafter be called "bi-casting" whenever applicable.

That is, in the exemplary configuration of FIG. 1, the switch 103 relays (forwards) data packets not only to the access point A1 104 corresponding to the access area where the mobile node (MN) 106 currently stays, but also to the access point A2 105, which is the destination access point, in parallel. This bi-cast process enables the mobile node (MN) 106 to receive, without interruption, the data packets from different access points upon its movement to the access point A2 105 from the access point A1 104.

In a system of the present invention, the switch 103 as the data relay apparatus performs this bi-cast process, whereby to support high-speed handovers by the mobile node 106. The bi-casting allows the mobile node 106 to receive data packets at once, upon connection to a new access point after a handover.

In order to implement the bi-casting, the switch 103 as the data (packet) relay apparatus in the configuration of the present invention has a function of performing the following processing, besides the existing (conventional) processing.

(S1) Adding, deleting, and searching an arbitrary entry in the MAC learning table held by the switch.

(S2) Receiving a handover start message from the mobile node.

(S3) Adding a new entry to the MAC learning table such that data packets addressed to the mobile node are forwarded both to a port to which a current access point of the mobile node is connected, and to a port to which a next access point is connected, according to the handover start message from the mobile node. The current access point means an access point to which the mobile node is currently connected, and the next access point means an access point to which the mobile node is scheduled to be connected next.

(S4) Transmitting a handover setting completion message to the mobile node after the new entry is added to the MAC learning table.

(S5) Receiving a handover end message from the mobile node.

(S6) Deleting the old entry from the MAC learning table so as to prohibit forwarding of the data packets addressed to the mobile node, to the port to which the old access point of the mobile node is connected, according to the handover end message from the mobile node. The old access point means an access point to which the mobile node was connected before a handover.

On the other hand, the mobile node 106 that transmits and receives packets has a function of performing the following processing.

(N1) Checking potential wireless interface-side MAC addresses of access points to which the mobile node is scheduled to be connected next at all times or periodically. This is accomplished by background scanning in which all data transmission/reception channels are periodically scanned to store source MAC addresses of beacons received during the scanning (i.e., the wireless interface-side MAC addresses of the access points).

(N2) Transmitting a handover start message to the uplinked switch 103 immediately before performing a handover when the mobile node 106 intends to switch to a next access point while receiving data packets such as streaming video.

(N3) When receiving a handover setting completion message from the switch, the mobile node performs the handover at once. When the mobile node fails to receive the handover setting completion message even after a predetermined time has passed from its having transmitted the handover start message, it re-transmits the handover start message. If the mobile node still fails to receive the handover setting completion message even when it re-transmitted the handover start message a predetermined number of times or more, it gives up its attempts to cause the switch to make a bi-cast setting, and starts the handover immediately.

(N4) Transmitting a handover end message to the uplinked switch after the handover.

Furthermore, the following function is added to each access point connected to the switch 103.

(A1) Periodically transmitting to the uplinked switch 103 an arbitrary ethernet frame the source MAC address of which is a wireless interface-side MAC address of the access point. Note that "periodically" means such a frequency at which the Ethernet switch does not delete a particular entry from its MAC learning table.

The transmission of an ethernet frame from an access point to the switch allows the Ethernet switch to learn which access point is connected to which port whereby to cause its MAC learning table to create entries as to the downlinked access points.

Next, how the mobile node, the access points, and the switch act when the mobile node 106 switches its access points, i.e., before and after a handover will specifically be described.

As mentioned above, each of the access points downlinked from the switch 103, i.e., the access points A1 104 and A2 105 in FIG. 1 periodically transmits an arbitrary ethernet frame containing its wireless interface-side MAC address as the source address. The switch 103 creates and maintains the entry as to the wireless interface-side MAC address of each access point in the MAC learning table stored in storage means therewithin, based on the received frame.

That is, the switch 103 receives data from each access point that performs data forwarding to the mobile node, and sets data corresponding to an output port for each access point, in the MAC learning table, based on the received data, whereby the switch 103 creates and maintains entries shown in FIG. 2 in the MAC learning table.

Let a case be assumed where the mobile node (MN) (MAC address: MNM) 106 starts communication via the access point A1 104. The mobile node (MN) 106 is receiving, for example, streaming video from the correspondent node (CN) 101). At this point, the switch 103 adds a new entry related to this communication to its MAC learning table through an address analysis of a packet exchanged between the correspondent node (CN) 101 and the mobile node (MN) 106. That is, a new entry shown in FIG. 3 is added to the MAC learning table stored in the storage section of the switch 103.

The MAC address [MNM] indicated in the new entry to the MAC learning table of FIG. 3 is the MAC address of the mobile node (MN) 106. This new entry indicates that any packet addressed to the MAC address [MNM] is arranged to be outputted to the output port P1.

Even if the mobile node (MN) 106 moves from the access area 111 to the access area 112 under this situation, and thus handover is performed to switch the access point A1 104 to the access point A2 105, the configuration of the present invention permits the mobile node (MN) 106 to receive the streaming video at once from the access point A2 105 upon connection to the access point A2 105.

A process performed before and after a handover in a communication system of the present invention will now be described in detail. The mobile node (MN) 106 transmits a handover start message to the switch (SW) 103 before the handover.

Figure 4A:
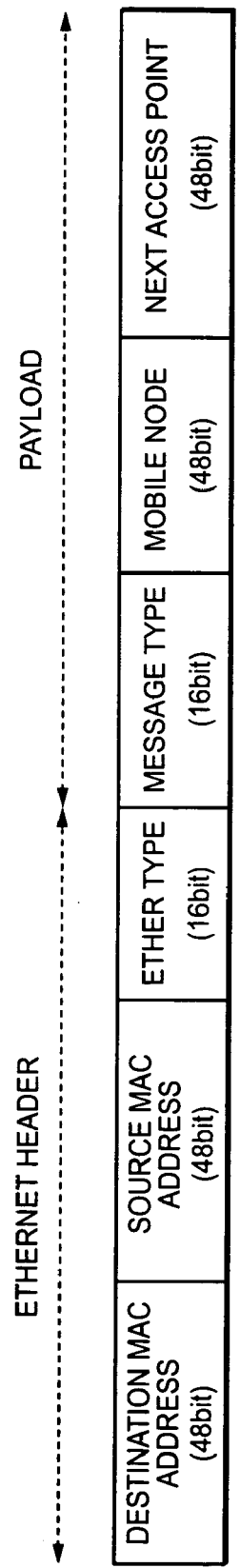
FIGS. 4A and 4B are diagrams illustrating a data format of a handover start message transmitted from the mobile node (MN) to the switch.

FIG. 4A shows an exemplary format of the handover start message transmitted from the mobile node (MN) 106 to the switch (SW) 103.

The handover start message shown in FIG. 4A is implemented by an ethernet frame in which an ether type field contains an ether type number specified for a handover message (0x01ca in an example shown in the figure). The source MAC address contains the MAC address [MNM] of the mobile node (MN) 106, and a destination MAC address contains a broadcast MAC address (0xffffff).

The reason why the broadcast MAC address is loaded in the destination MAC address instead of the MAC address of the target switch 103, is that the mobile node (MN) 106 does not know the MAC address of the switch 103. A message type field of the handover start message contains a message number (0x01) indicative of a handover start message. A mobile node field contains the MAC address [MNM] of the mobile node (MN) 106. A next access point field contains the wireless interface-side MAC address [AWM2] of the access point A2 105 to which the mobile node will be connected after a handover.

Figure 4B:
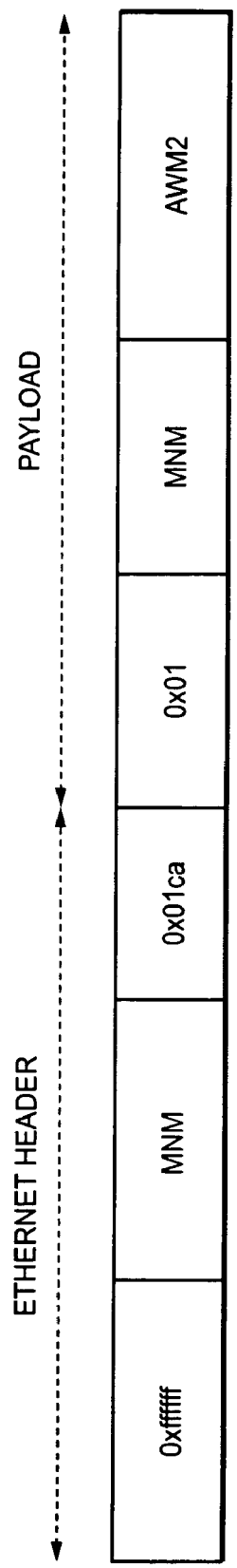

FIG. 4B shows an exemplary handover start message in which the above-mentioned data are loaded in the relevant fields.

The handover start message from the mobile node (MN) 106 reaches the switch (SW) 103 via the access point A1 104 to which the mobile node (MN) 106 is currently connected.

The switch (SW) 103 receives the handover start message via the port P1. The switch (SW) 103 first checks the ether type field of the received message to see if it contains the ether type number (0x01ca) for a handover message. If the ether type field contains an ether type number other than 0x01ca, the switch (SW) 103 performs a prescribed process according to the contained number.

If the ether type field contains the ether type number (0x01ca) for a handover message, then the switch (SW) 103, determining that it is a special ethernet frame for handover, performs the following process.

Although the handover start message itself sets the broadcast MAC address in the destination MAC address as mentioned above, note that the switch 103 having received the handover start message does not forward this message to other ports, once this message is verified to be the handover start message based on its ether type number.

Also, the switch 103 checks, upon reception of the handover start message via the port P1, if there is an entry related to the mobile node (MN) 106 in its MAC learning table according to its normal function as the Ethernet switch, and if there is no such entry, it creates an entry related to the mobile node (MN) 106, whereby the entry as to the mobile node (MN) 106 shown in FIG. 3 is created.

The switch 103 then references the message type field of the handover start message to check that there is the message number (0x01) indicative of a handover start message. Thereafter, the switch 103 searches the MAC learning table to check if there is an entry related to the MAC address [AWM2] of the access point A2 105 indicated in the next access point field.

If it is determined from the search that the entry related to the MAC address [AWM2] of the next access point A2 105 is not registered in the MAC learning table, the switch 103 ends the process related to the handover start message.

If, on the other hand, the entry related to the MAC address [AWM2] is registered in the MAC learning table, a new entry is created in the table, the new entry associating the output port P2 associated with the MAC address [AWM2] of the next access point A2 105, with the MAC address [MNM] of the mobile node (MN) 106 indicated in the mobile node field of the handover start message.

The created new entry is shown in FIG. 5. As shown in the figure, the new entry is such that the output port P2, i.e., the output port P2 associated with the MAC address [AWM2] of the next access point A2 105 is registered for the MAC address [MNM] of the mobile node (MN) 106.

As a result, the switch 103 has two entries as to the mobile node (MN) 106. That is, as shown in FIG. 6, the two entries respectively associates the P1 and P2 with the MAC address [MNM] of the mobile node (MN) 106 as the output ports.

Therefore, after this process, when the switch 103 receives a data packet addressed to the mobile node (MN) 106, i.e., a data packet the destination address of which is set to [MNM], the switch 103 forwards the data packet to both ports P1 and P2 according to the latest entries in its MAC learning table (see FIG. 6). That is, the bi-cast process is performed on the received packet.

After having created the new entry in the MAC learning table, the switch 103 transmits a handover setting completion message to the mobile node (MN) 106. This handover setting completion message is transmitted only to the port P1 at which the handover start message is received.

Figure 7A:
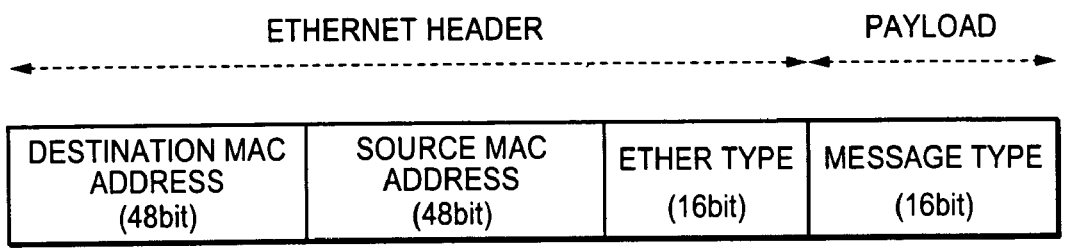
FIGS. 7A and 7B are diagrams illustrating a data format of a handover setting completion message transmitted from the switch to the mobile node (MN)

FIG. 7A shows an exemplary format of the handover setting completion message. Similar to the handover start message, the handover setting completion message shown in FIG. 7A is an example implemented by an ethernet frame in which 0x01ca is loaded in the ether type field.

Figure 7B:
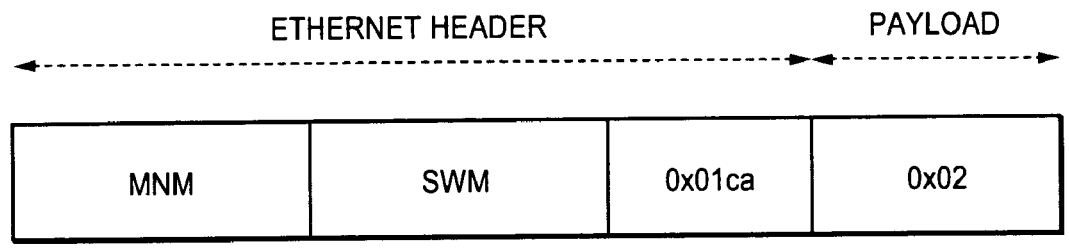

The source MAC address contains the MAC address [SWM] of the switch (SW) 103, and the destination MAC address contains the value of the source MAC address of the received handover start message, i.e., the MAC address [MNM] of the mobile node (MN) 106. A message number (0x02) indicative of a setting completion message is loaded in the message type field of the handover setting completion message. FIG. 7B shows an exemplary structure of data loaded in the handover setting completion message.

The handover setting completion message shown in FIGS. 7A and 7B transmitted from the switch (SW) 103 is outputted from the port P1 at which the handover start message is received, to reach the mobile node (MN) 106 via the access point A1 104.

The mobile node (MN) 106 having received the handover setting completion message first checks the ether type field of the received handover setting completion message to verify that it contains the ether type number (0x01ca) for a handover message. If an ether type number other than 0x01ca is set, the mobile node 106 performs a process according to the set ether type.

If the ether type number (0x01ca) for a handover message is set in the ether type field, then the mobile node 106, determining that the message received is a special ethernet frame related to handover, performs the following process.

The mobile node (MN) 106 references the message type field of the handover setting completion message to check that the message number (0x02) indicative of a setting completion message is contained, after which it performs a handover; i.e., the mobile node (MN) 106 moves from the access area 111 to the access area 112, and switches its access points by releasing its connection from the access point A1 104 and establishing a connection to the access point A2 105.

Note that the mobile node (MN) 106 re-transmits the handover start message when not receiving the handover setting completion message from the switch 103 after the passage of a predetermined or more time from its having broadcast the handover start message. If the mobile node (MN) 106 cannot receive the handover setting completion message from the switch even after having re-transmitted the handover start message a prescribed number of times, the mobile node 106, abandoning its request to the switch to set a bi-cast process, connects to the access point A2 105 through a handover.

Note that the mobile node (MN) 106 transmits, after the handover, a handover end message to the switch 103, irrespective of whether or not the switch 103 has performed the bi-cast setting, in order to cause the switch 103 to delete an old entry remaining in the MAC learning table, the old entry being the entry (see FIG. 3) associating the output port P1 of the old access point A1 104 of the mobile node (MN) 106 with the MAC address [MNM] of the mobile node (MN) 106.

Therefore, the switch 103 receives the handover end message, irrespective of whether or not the switch has performed the bi-cast setting. The switch 103 does not create the above-mentioned new entry, i.e., the entry associating the output port P2 for the new access point A2 105 with the MAC address [MNM] of the mobile node (MN) 106, unless it performs the bi-cast process. Hence, by receiving this handover end message from the mobile node (MN) 106 via the new access point A2 105 and the port P2, the switch 103 creates the above-mentioned entry, i.e., the entry associating the output port P2 for the new access point A2 105 with the MAC address [MNM] of the mobile node (MN) 106, for registration in its MAC learning table.

Figure 8A:
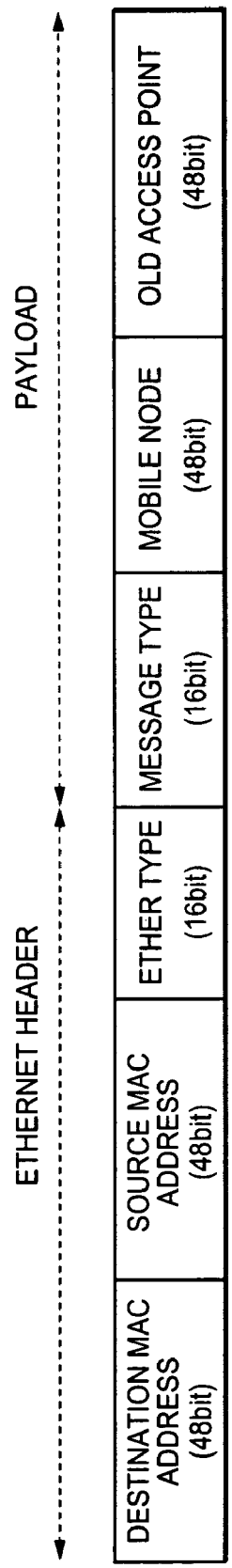
FIGS. 8A and 8B are diagrams illustrating a data format of a handover end message transmitted from the mobile node (MN) to the switch.

FIG. 8A shows an exemplary format of the handover end message, which is implemented, similarly to the handover start message, by an ethernet frame in which 0x01ca is loaded in the ether type field.

The source MAC address field contains the MAC address [MNM] of the mobile node (MN) 106. The destination MAC address field contains the broadcast MAC address (0xffffff), or, if a setting completion message is received from the switch 103 before a handover, the value [SWM] of the source MAC address contained in the setting completion message received.

Figure 8B:
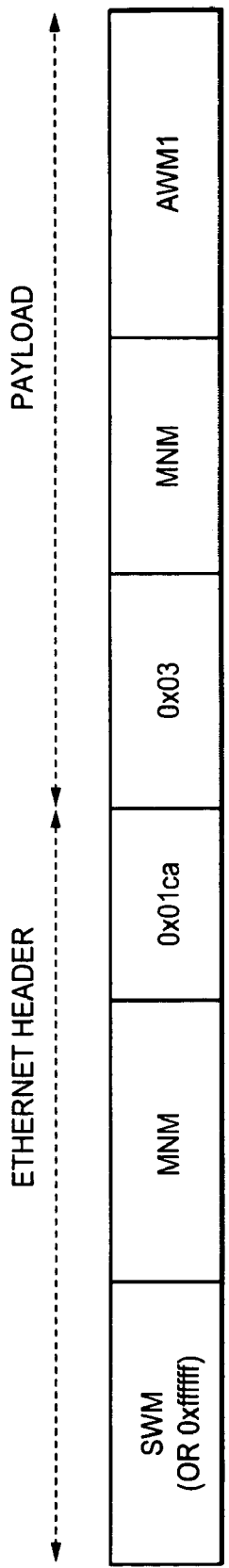

The message type field of the handover end message contains a message number (0x03) indicative of a handover end message. The mobile node field contains the MAC address [MNM] of the mobile node (MN) 106. An old access point field contains the wireless interface-side MAC address [AWM1] of the access point A1 104 to which the mobile node 106 was connected before the handover. The structure of handover end message having these data loaded therein is shown in FIG. 8B.

The handover end message sent from the mobile node (MN) 106 reaches the switch (SW) 103 via the access point A2 105 to which the mobile node (MN) 106 is connected after the handover.

The switch (SW) 103 having received the handover end message via the port P2 first checks the ether type field in the handover end message received to verify whether or not the ether type number for a handover message (0x01ca) is contained. If it is other than the ether type number (0x01ca) for a handover message, then the switch 103 performs a process according to the contained ether type number.

If the ether type field of the handover end message received contains the ether type number (0x01ca) for a handover message, the switch 103 determines that this is a special ethernet frame related to handover, thereby performing the following processing.

Note that once having determined that the message received is a handover end message even if the broadcast MAC address is specified in the destination MAC address, the switch 103 does not forward that message to other ports. Also, at the time of its receive of the handover end message via the port P2, the switch 103 performs an entry updating process in its MAC learning table according to the normal Ethernet switch function; i.e., it checks the presence of the entry shown in FIG. 5, and, if that entry is absent, creates and registers and entry. If the above-mentioned bi-cast process has been performed, the switch 103 creates no entry since the entry has already been created.

The switch 103 further references the message type field of the handover end message to check that the message number is (0x03) indicative of a handover end message, after which it searches through its MAC learning table the entry related to the MAC address [AWM1] of the access point A1 104 indicated in the old access point field to obtain the corresponding port P1.

The switch 103 still further deletes the entry associating the port P1 with the MAC address [MNM] of the mobile node (MN) 106 indicated in the mobile node field of the handover end message, from its MAC learning table.

Through this entry deletion process, the entry (see FIG. 3) is deleted, which associates the port P1 for the access point A1 104 to which the mobile node (MN) 106 was connected before the handover, with the MAC address [MNM] of the mobile node (MN) 106.

As a result of this process, it is only the entry shown in FIG. 5 that remains in the MAC learning table as an entry as to the mobile node (MN) 106; i.e., the entry associating the port P2 for the access point A2 105 to which the mobile node (MN) 106 is newly connected after the handover, with the MAC address [MNM] of the mobile node (MN) 106. That is, the bi-cast setting is released. From then on, even if the switch (SW) 103 receives a data packet addressed to the mobile node (MN) 106 (destination address: MNM), the switch 103 will forward that data packet only to the port P2 according to the entry shown in FIG. 5 held in its latest MAC learning table.

The above has described the behavior of each of the mobile node, the access points, and the Ethernet switch.

Note that it is arbitrary for the mobile node (MN) 106 to send a handover start message before a handover. Thus, the mobile node (MN) 106 is not required to send a handover start message unless a high-speed handover is particularly required, i.e., for example, unless it is required to receive data packets in succession before and after a handover. Also, it would be desirable to send a handover end message once a handover is completed after a handover start message has been sent and the switch has then made a bi-cast setting. However, even if the handover end message is not transmitted, or the end message is lost somewhere along its way, for example, these events would not particularly affect the successive reception of the data packets.

However, in that case, the switch (SW) 103 does not delete the entry shown in FIG. 3, i.e., the old entry setting the port P1 corresponding to the old access point A1 104 of the mobile node (MN) 106 until a predetermined time passes, and thus the data packets are forwarded also to the access point A1 104 to which the mobile node (MN) 106 was connected before its movement. This would be a serious problem in terms of network load. Therefore, once the mobile node (MN) 106 has performed the handover after the handover start message has been sent and the switch (SW) 103 has then made the bi-cast setting, the mobile node (MN) 106 should send a handover end message to the extent possible.

Referring next to FIGS. 9A to 9C, some specific examples of entries as to the mobile node (MN) 106 in the MAC learning table held by the switch (Ethernet switch) 103 will be described. These entries refer to points of time, which are before a bi-cast setting for the mobile node (MN) 106 is made, while the bi-cast setting is active, and after the bi-cast setting is released, assuming that the MAC address of the mobile node (MN) 106 is [00:01:02:83:04:86] and the port numbers of the ports P1 and P2 of the switch (Ethernet switch) 103 are a P1=1 and a P2=2, respectively.

FIG. 9A shows an entry as to the mobile node (MN) 106 in the MAC learning table held by the switch (Ethernet switch) 103 before a bi-cast setting for the mobile node (MN) 106 is made. At this point of time, the mobile node (MN) 106 stays within the access area 111 corresponding to the access point A1 104 in FIG. 1. Thus, the switch 103 has an entry setting the port P1=1 corresponding to the access point A1 104 as the output port for the mobile node (MN) 106.

FIG. 9B shows an entry as to the mobile node (MN) 106 in the MAC learning table held by the switch (Ethernet switch) 103 while the bi-cast setting for the mobile node (MN) 106 is active. At this point of time, although the mobile node (MN) 106 still stays within the access area 111 corresponding to the access point A1 104 in FIG. 1, the switch 103 receives the above-mentioned handover start message (see FIGS. 4A and 4B) from the mobile node (MN) 106 and adds an entry based on the received message.

This additional entry sets the port P2=2 corresponding to the access point A2 105 which is the next access point contained in the handover start message (see FIGS. 4A and 4B). As a result, the switch 103 holds two entries as to its output ports for the mobile node (MN) 106, one entry setting the port P1=1 corresponding to the access point A1 104 as the output port for the mobile node (MN) 106, and the additional entry. With the entries set as mentioned above, a packet addressed to the mobile node (MN) 106 is sent in parallel to both the access points A1 104 and A2 105 via the output ports P1 and P2, respectively.

FIG. 9C shows an entry as to the mobile node (MN) 106 in the MAC learning table held by the switch (Ethernet switch) 103 after the bi-cast setting for the mobile node (MN) 106 is released. At this point of time, the mobile node (MN) 106 stays within the access area 112 corresponding to the access point A2 105 in FIG. 1.

The switch 103 then receives the handover end message (see FIGS. 8A and 8B) from the mobile node (MN) 106 via the destination access point A2 105, to perform the processing corresponding to the received message, i.e., for deletion of the old entry.

Resulting from the entry deletion process is the updated version of the MAC learning table shown in FIG. 9C. As mentioned above, what is deleted is the entry setting the port P1=1 corresponding to the access point A1 104 which is the old access point contained in the handover end message (see FIGS. 8A and 8B). As a result, the switch 103 has only the entry setting the port P2=2 corresponding to the access point A2 105 as the output port for the mobile node (MN) 106.

In this way, the switch 103 keeps the MAC learning table sequentially changing as shown in FIGS. 9A, 9B, and 9C, whereby the mobile node (MN) 106 can receive data (packets) without interruption at the time of its movement (handover) from the access area 111 to the access area 112 shown in FIG. 1.

Referring then to a flowchart shown in FIG. 10, a sequence of steps will be described, which are performed by the mobile node (MN) 106 when the mobile node transmits the above-mentioned handover start message and handover end message.

As mentioned earlier, the mobile node (MN) monitors, constantly or periodically, the potential wireless interface-side MAC addresses of access points to which it will be connected next. This is implemented by background scanning in which all data transmission/reception channels are periodically scanned, and then by storing the source MAC addresses of the beacons (the wireless interface-side MAC addresses of the access points) received during the scanning.

When the mobile node (MN) attempts to disconnect its current access point and connect to another access point, i.e., when it attempts to hand over its connection, based on a comparison of the intensities of the received beacons from the potential access points, the mobile node (MN) broadcasts, in step S101, a handover start message (message type: 0x01) having the data format earlier described with reference to FIGS. 4A and 4B.

In step S102, the mobile node (MN) waits after transmission the handover start message, and in step S103, it determines that a prescribed regular time has elapsed. Within the regular time, in step S105, the mobile node (MN) determines whether or not an ethernet frame is received, and if an ethernet frame is received, then it determines, in step S106, whether or not the received frame has the ether type number (0x01ca) for a handover message.

If the received frame does not contain 0x01ca, then the mobile node (MN) performs, in step S107, a process according to the ether type and message type set in the message, and then waits (S102). If the received frame has 0x01ca, then the mobile node (MN) goes to step S108 to determine whether or not the received frame has the message type (0x02) indicative of a handover setting completion message. If no, the mobile node (MN) destroys the received frame in step S109, and then waits (S102), because the mobile node (MN) could receive any message other than a handover setting completion message at this point of the process.

If the received frame is determined in step S108 to include the message type (0x02) indicative of a handover setting completion message, then the mobile node (MN) performs, in step S110, a handover process, i.e., switches its access points.

After the handover has been performed, the mobile node (MN) sends to the switch or broadcasts, in step S111, the handover end message described earlier with reference to FIGS. 8A and 8B.

Note that the mobile node (MN) goes to step S104 if yes in step S103, i.e., if the predetermined time has elapsed, to determine whether or not the handover start message is re-transmitted a predetermined number of times. If no, the mobile node re-transmits the message in step S101. This re-transmission process is repeated within a prescribed wait time.

If it is determined in step S104 that the handover start message is re-transmitted the predetermined number of times, the mobile node performs the handover process in step S110 even if it has not received the handover setting completion message yet. And after the handover process is completed, the mobile node broadcasts, in step S111, the handover end message described earlier with reference to FIGS. 8A and 8B.

Figure 11:
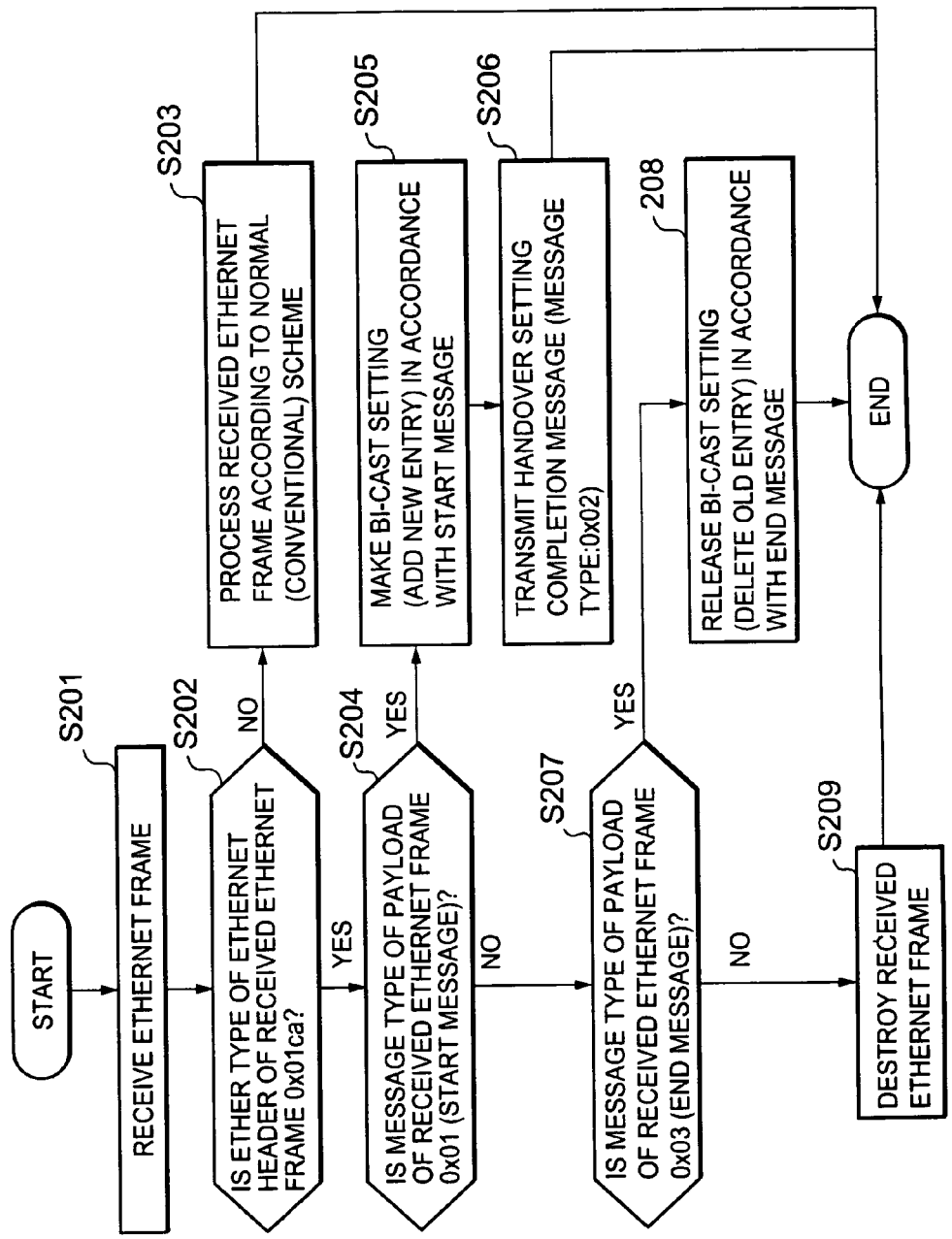
FIG. 11 is a flowchart illustrating a process performed by the switch during the handover.

Referring next to a flowchart of FIG. 11, a sequence of steps performed by the switch will be described.

When receiving an ethernet frame in step S201, the switch determines whether or not the ether type in the header of the received ethernet frame is (0x01ca), i.e., the ether type number for a handover message. If the received frame does not contain 0x01ca, then the switch performs, in step S203, processing according to the ether type and message type set in the message, and thereafter ends the process.

If it is determined in step S202 that the ether type in the header of the received ethernet frame is (0x01ca), i.e., the ether type number for a handover message, then the switch goes to step S204 to determine whether or not the message type in the payload of the received ethernet frame is (0x01) indicative of a handover start message. If yes, the switch goes to step S205 to make a bi-cast setting based on the handover start message. That is, the switch adds to its MAC learning table an entry setting a port corresponding to the next access point contained in the handover start message, as an output port for the mobile node (MN).

Thereafter, in step S206, the switch sends a handover setting completion message (see FIGS. 7A and 7B) to the mobile node that has sent thereto the handover start message.

If determining in step S204 that the message type in the payload of the received ethernet frame is not (0x01) indicative of a handover start message, the switch goes to step S207 to determine whether or not the message type is (0x03) indicative of a handover end message.

If determining that the message type is (0x03) indicative of the handover end message, then the switch goes to step S208 to perform the processing based on the handover end message; i.e., it deletes from the MAC learning table the entry consisting of data that combines the output port corresponding to the old access point contained in the handover end message (see FIGS. 8A and 8B), with the mobile node (MN), after which the switch ends the process.

If determining in step S207 that the message type is not (0x03) indicative of a handover end message, then the switch destroys the received frame in step S209, and then ends the process.

Figure 12:
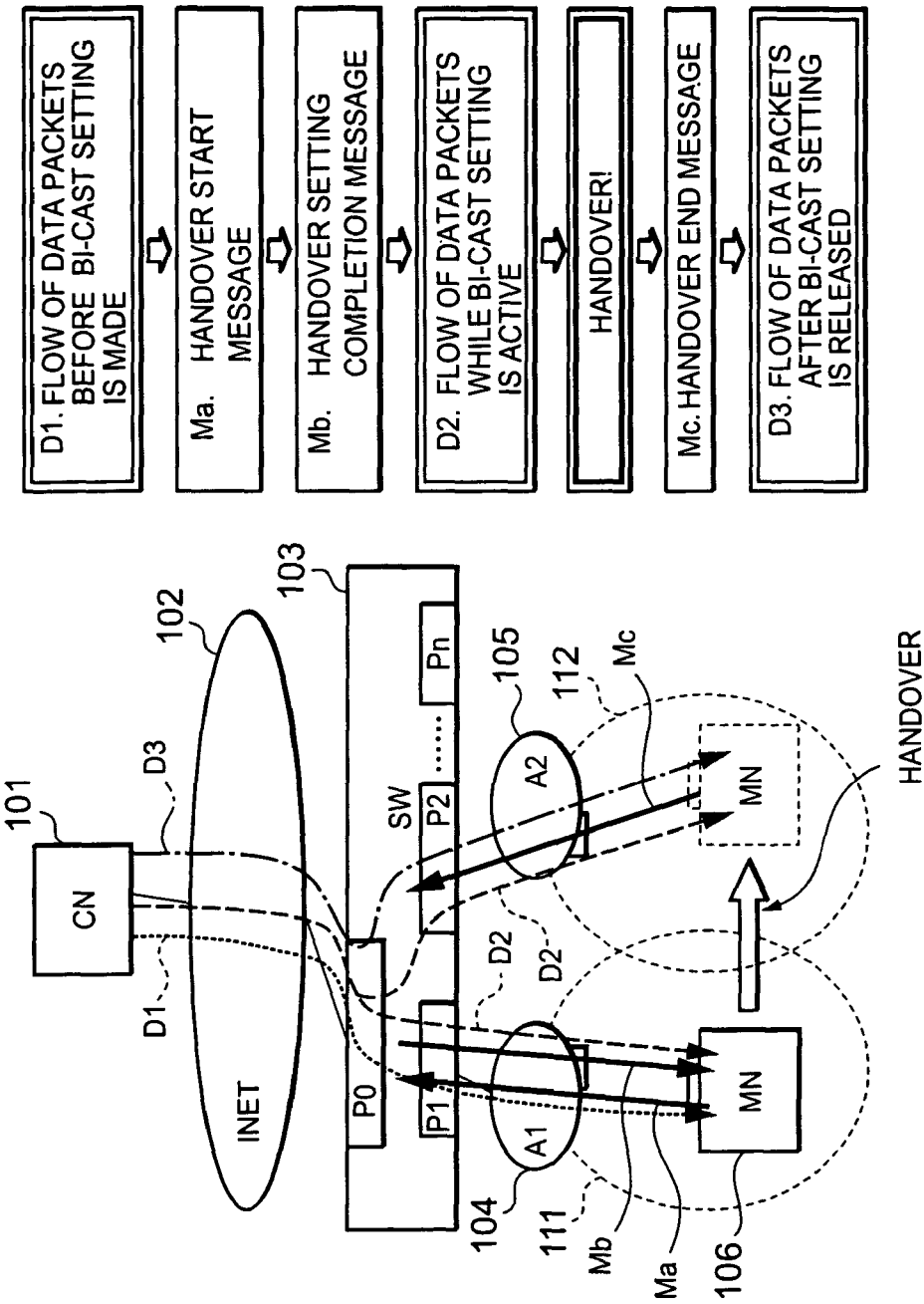
FIG. 12 is a diagram illustrating a flow of messages and data (packets) involved during the handover.

Referring next to FIG. 12, a flow of data in transmitting/receiving the handover messages and data packets will be described.

D1, D2, and D3 in FIG. 12, represent a flow of data (packets) between correspondent node (CN) 101 and the mobile node (MN) 106. Also, Ma, Mb, and Mc represent the handover messages, where Ma is the handover start message; Mb is the handover setting completion message; and Mc is the handover end message.

A handover by the mobile node (MN) 106 is performed via switching from the access point A1 104 to the access point A2 105 resulting from the mobile node's movement from the access area 111 corresponding to the access point A1 104 to the access area 112 corresponding to the access point A2 105.

With the mobile node (MN) 106 staying in the access area 111, data (packets) addressed to the mobile node (MN) 106 from the correspondent node (CN) 101 is, as shown by D1 of FIG. 12, outputted to the port P1 based on one entry (see FIG. 3) in the MAC learning table held by the switch 103, and then transmitted/received via the access point A1 104.

Under this condition, the mobile node (MN) 106 broadcasts (Ma of FIG. 12) the handover start message (see FIGS. 4A and 4B) having next access point data contained therein, before the handover process. When receiving the handover start message (see FIGS. 4A and 4B), the switch 103 adds, to its MAC learning table, an entry setting a port corresponding to the access point A2 105 as the output port for the mobile node (MN) 106, based on the next access point data contained in the handover start message as described above. In addition, the switch 103 sends the handover setting completion message (see FIGS. 7A and 7B) to the mobile node (MN) 106 (Mb of FIG. 12).

As a result of this process, the switch 103 outputs the data (packets) addressed to the mobile node (MN) 106 from the correspondent node (CN) 101, to the ports P1 and P2 in parallel based on the two entries (see FIG. 6) listed in its MAC learning table, as shown by D2 of FIG. 12.

The mobile node (MN) 106 having received the handover setting completion message from the switch 103 performs the handover, or switches from the access point A1 104 to the access point A2 105, and thereafter transmits in the form of an ethernet frame or broadcasts, the handover end message (see FIGS. 8A and 8B) containing the old access point data, to the switch 103.

Thereafter, the switch 103 deletes the entry corresponding to the old access point data from the MAC learning table based on the handover end message (see FIGS. 8A and 8B). From this deletion, remains the only one entry in the MAC learning table of the switch 103, the only one entry associating only the output port P2 for the access point A2 105 set as corresponding to the access area 112 where the mobile node (MN) 106 currently stays, with the mobile node (MN) 106.

As a result of this processing, the switch 103 outputs the data (packets) addressed to the mobile node (MN) 106 from the correspondent node (CN) 101, to the port P2 based on the one entry (see FIG. 5) in its MAC learning table, as shown in D3 of FIG. 12.

In this way, the switch 103 sequentially updates the entries corresponding to the mobile node in its MAC learning table based on the relevant handover messages, whereby the mobile node (MN) 106 can receive the data (packets) without interruption at the time of its movement (handover) from the access area 111 to the access area 112 shown in FIG. 1.

In the above-mentioned embodiment, the bi-cast process has been described, in which a mobile node determines one destination access area, sets an access point corresponding to the determined access area as a next access point, and sends to a switch a handover start message containing a MAC address of the next access point, and also in which the switch adds an entry to its MAC learning table based on the received message, and sends data (packets) addressed to the mobile node to the two access points, old and new, in parallel, according to the updated MAC learning table. However, note that the switch may alternatively send three or more data items (packets) in parallel via output ports corresponding to three or more access points, in addition to the parallel output to two output ports.

This alternative process may be performed as, for example, a process for the mobile node failing to determine one next access point. That is, when the intensities of beacons received from a plurality of access points by the mobile node through its background scanning for periodically scanning all data transmission/reception channels are not distinguishable among the plurality of access points, the mobile node sets the plurality of MAC addresses (wireless interface-side MAC addresses) of these access points as potential next access points in a handover start message (see FIGS. 4A and 4B), for transmission to the switch (broadcasting).

The switch having received such a handover start message containing the plurality of next access point data items (MAC addresses) adds, to its MAC learning table, a plurality of entries that list ports set for the plurality of next access points contained in the message as the output ports for the mobile node. In this case, a total of three or more entries is listed for the mobile node in the MAC learning table, including one entry setting the output port corresponding to the current access point, and the other entries respectively setting two or more output ports corresponding to the two or more next access points.

Under such settings, the data (packets) addressed to the mobile node (MN) are transmitted in parallel according to the three or more entries set in the MAC learning table, respectively. Hence, the mobile node can receive the data (packets) continuously even if it moves in to any of the plurality of next access points.

Actually, it is only one access point to which the mobile node (MN) will be connected after the handover, and thus it is via that access point which is the actually selected one of the plurality of potential next access points that a handover end message is transmitted from the mobile node to the switch. The switch deletes from the MAC learning table the entry corresponding to the old access point based on the handover end message received, and further deletes the entries corresponding to those next access points which were added as the next access points but to which no connection was in fact established. As a result, after the completion of the handover, only the entry remains in the MAC learning table, the entry setting the port corresponding to the access point to which the mobile node has actually been connected, as the output port for the mobile node.

In this way, the switch forwards three or more data items (packets) in parallel, whereby the switch can accommodate processing for any complicated movement by the mobile node and hence uninterrupted transmission of data can be realized.

Figure 13:
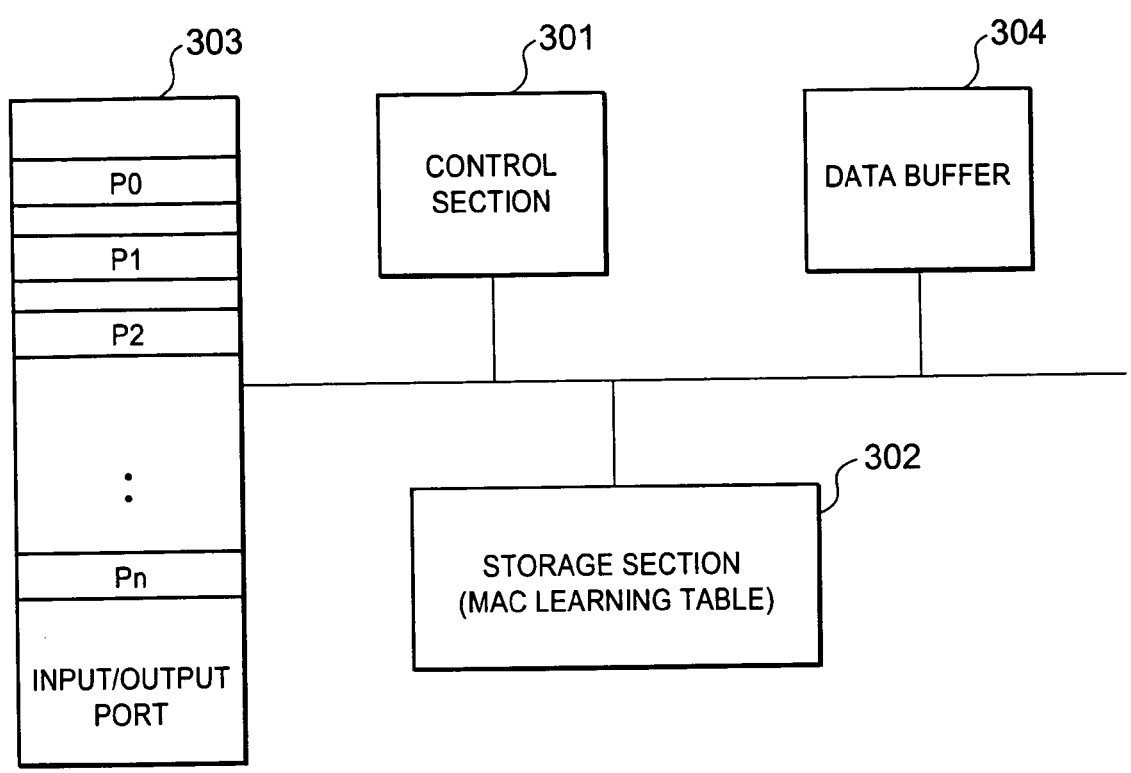
FIG. 13 is a block diagram showing an exemplary configuration of the switch.
Figure 14:
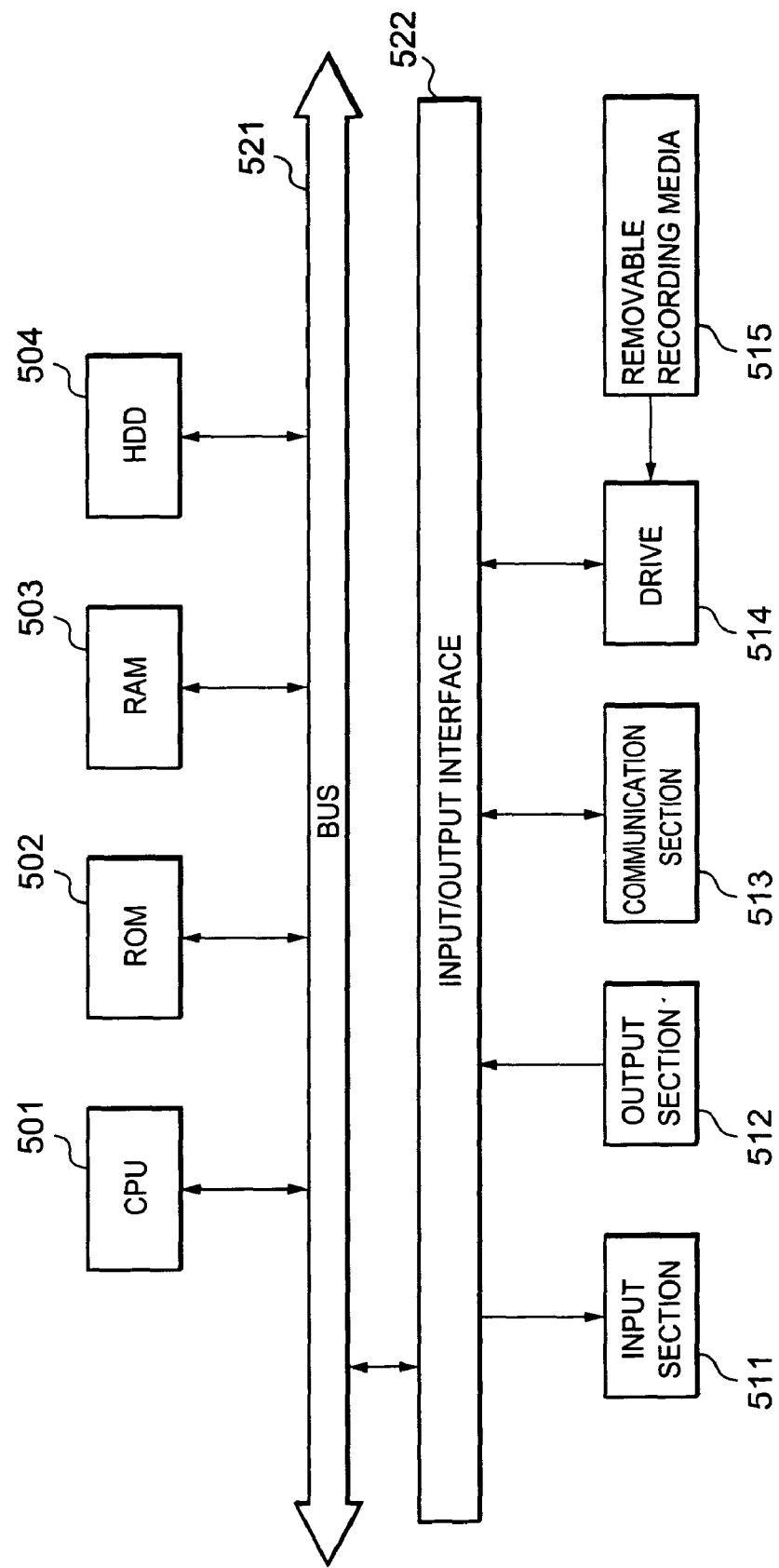
FIG. 14 is a block diagram showing an exemplary configuration of the mobile node (MN).

Referring next to FIGS. 13 and 14, exemplary configurations of the switch 103 and the mobile node 106 will be described.

FIG. 13 shows an exemplary configuration of the switch. The switch has a data (packet) input/output port 303 for nodes, and a data buffer 304 for temporarily storing data (packets) inputted via the input/output port 303.

The switch also has a storage section 302 for storing the above-mentioned MAC learning table, and a control section 301 for performing data forwarding control as a data switching process based on the header information (addresses) obtained by verifying header information of data (packets) inputted/outputted via the input/output port 303, and also for adding, deleting, and updating entries in the MAC learning table.

The control section 301 performs processing including: receiving a handover start message from a mobile node, and adding a new entry to the MAC learning table such that data (packets) addressed to the mobile node will be forwarded not only to a port to which a current access point of the mobile node is connected, but also to a port to which a next access point is connected, according to the received message; transmitting a handover setting completion message to the mobile node after adding the new entry to the MAC learning table; receiving a handover end message from the mobile node; and deleting an old entry from the MAC learning table such that the data (packets) addressed to the mobile node will not be forwarded to the port to which the old access point is connected, according to the handover end message received from the mobile node. Programs for performing the above processing are stored in a memory (e.g., a ROM) within the control section 301, for reading out to a CPU within the control section 301.

Referring then to FIG. 14, an exemplary configuration of the mobile node (MN) 106 will be described. The mobile node (MN) 106 includes, for example, a PC and a PDA which have a communication processing function, a portable communication terminal, and the like.

An exemplary configuration of a mobile node (MN) provided with a CPU (Central Processing Unit) as control means is shown in FIG. 14. Note that the exemplary configuration shown in FIG. 14 is merely an example, and thus the mobile node (MN) may not necessarily be required to have all the functions shown in the figure.

A CPU 501 is a processor that executes various execution programs and OSs (Operating Systems). A ROM (Read-Only Memory) 502 stores programs for execution in the processing by the CPU 501 or fixed data as operation parameters. A RAM (Random-Access Memory) 503 is used as a storage area and a work area for the programs for execution by the CPU 501 and parameters appropriately changing during the execution of the programs.

A HDD (Hard Disk Drive) 504 performs control over a hard disk, and also performs processing of storing and reading various data to and from the hard disk. A bus 521 includes a PCI (Peripheral Component Interconnect) bus and the like, enabling data forwarding with input/output devices via modules and an input/output interface 522.

An input section 511 includes, for example, various input buttons, keyboards, and pointing devices. When the input section 511 is manipulated via a keyboard, a mouse or the like, or when data is received from a communication section 513, for example, a command is inputted to the CPU 501 to execute a program stored in the ROM 502. An output section 512 is, for example, a CRT, a liquid crystal display and the like, and displays various information in text, image and the like.

The communication section 513 performs a communication process with nodes or switches, and also performs, under the control of the CPU 501, a process of transmitting data supplied from storage sections, or data processed by the CPU 501 and receiving data from other nodes and switches.

A drive 514 processes recording/reproduction of removable recording media 515 including flexible discs, CD-ROMs (Compact-Disc Read Only Memories), MO (Magneto-optical) discs, DVDs (Digital Versatile Discs), magnetic discs, and semiconductor memories, and reproduces and stores programs or data from and on each removable recording medium 515.

When a program or data recorded on each recording medium is read for execution or processing by the CPU 501, the read program or data is supplied, via the input/output interface 522 or the bus 521, to, for example, the RAM 503 connected thereto.

Figure 10:
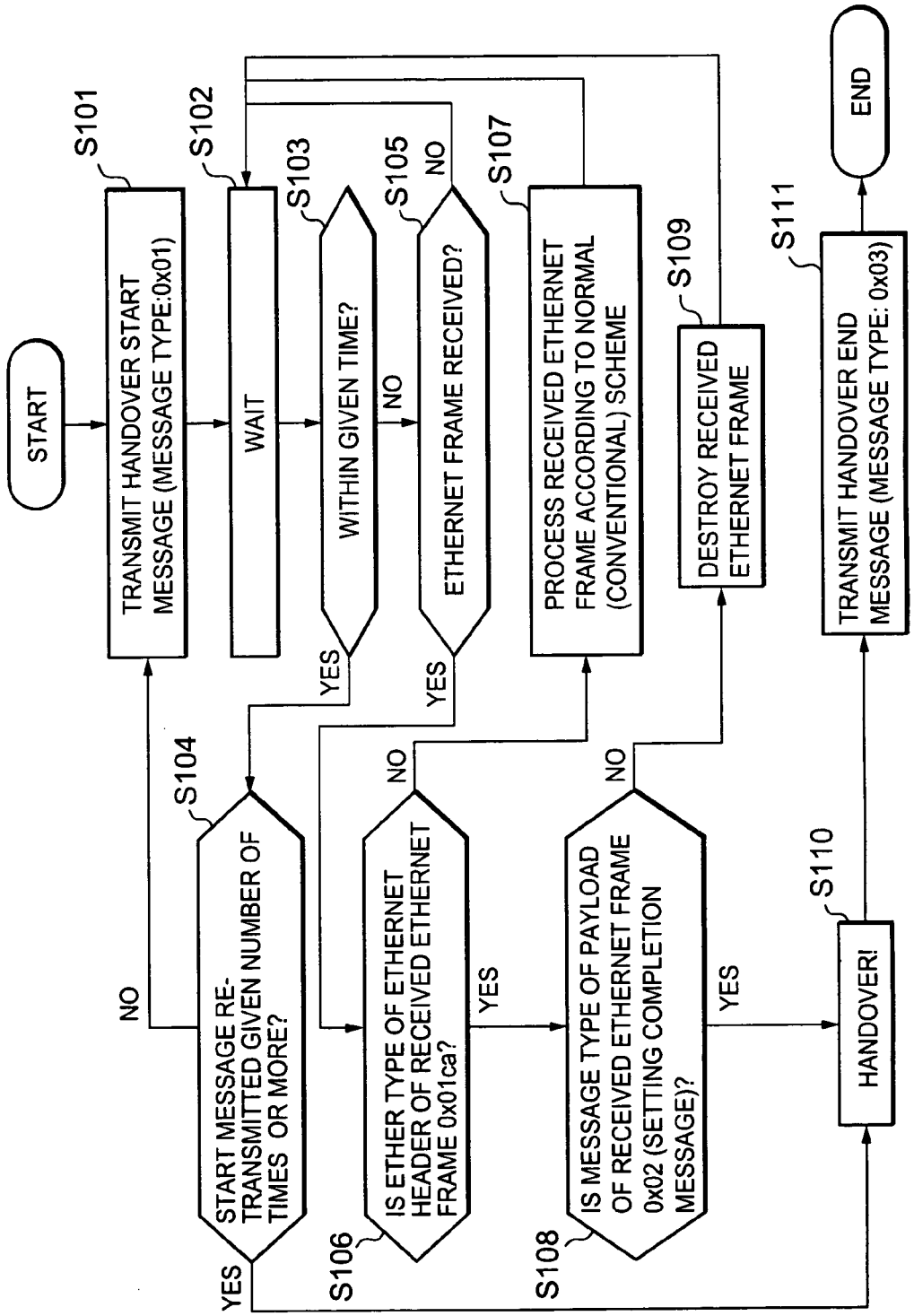
FIG. 10 is a flowchart illustrating a process performed by the mobile node (MN) during the handover.

A program for generating and sending the handover start message, receiving and verifying the handover setting completion message, and generating and sending the handover end message described in connection with FIG. 10 is stored in, for example, the ROM 502 and read and executed by the CPU 501. Additionally, the mobile node also performs the background scanning for periodically scanning all data transmission/reception channels to store the source MAC addresses of beacons (the wireless interface-side MAC addresses of access points) received during the scanning, and this background scanning program is also stored in the ROM 502, and read and performed by the CPU 501.

Note that the series of processes disclosed herein may be performed by hardware, software, or a combination of both. In a software configuration, a program recording processing sequences is installed to a memory incorporated into dedicated hardware within a computer, or alternatively, the program can be installed to a general-purpose computer capable of performing diverse processing.

For example, the program can be recorded in a hard disk and a ROM as recording media beforehand. Alternatively, it can be stored (or recorded) temporarily or permanently on a removable recording medium such as a flexible disc, a CD-ROM, a MO disc, a DVD, a magnetic disc, or a semiconductor memory. Such removable recording medium may be provided as so-called package software.

Note that the program may be installed to a computer from a removable recording medium such as mentioned above, wirelessly forwarded to the computer from a download site, or forwarded to the computer wired via a network, such as a LAN or the Internet, whereas the computer receives the thus forwarded program for installation to a recording medium such as a built-in hard disk.

Note also that the various processes disclosed in this specification may be performed time-serially according to the disclosure, or may be performed in parallel or individually, according to the processing capability of an apparatus performing the processes, or as necessary.

While the present invention has been described above in detail with reference to its preferred embodiment, it is understood that the disclosed embodiment is merely exemplary and that those skilled in the art can make modifications and substitutions thereof without departing from the scope and spirit of the invention which should not be construed in a restrictive sense but should be construed as defined by the appended claims.

What is claimed is:

1. A data forwarding controller for performing data forwarding control via a network, comprising:
   a plurality of data input/output ports;
   means for storing a MAC learning table in which a MAC address of data for forwarding is associated with an output port; and
   a control section for updating said MAC learning table,
   wherein said control section is configured to set, for a mobile node, in said MAC learning table, a plurality of entries associating different output ports with a MAC address of said mobile node, and output data addressed to said MAC address of said mobile node received via said network, to said plurality of output ports in parallel, based on said plurality of entries set in said MAC learning table, and
   said control section is configured to set an entry in said MAC learning table as an additional entry based on a MAC address of a next access point contained in a handover start message received from said mobile node, wherein said additional entry sets a port to which said next access point is connected, as an output port corresponding to said MAC address of said mobile node, and output said data addressed to said MAC address of said mobile node received via said network in parallel, to said output ports listed in said plurality of entries as to said MAC address of said mobile node set in said MAC learning table, wherein said output ports are a plurality of ports to which a current access point and said next access point of said mobile node are connected.

2. The data forwarding controller according to claim 1, wherein said control section is configured to set a plurality of entries respectively setting a port to which a current access point of said mobile node is connected and port(s) to which one or more next access points of said mobile node is connected, as output ports corresponding to said MAC address of said mobile node, and output said data addressed to said MAC address of said mobile node received via said network to said plurality of output ports set in said plurality of entries in parallel.

3. The data forwarding controller according to claim 1, wherein said control section is configured to transmit a handover setting completion message to said mobile node from which said handover start message is received, on condition that said setting of said additional entry in said MAC learning table based on said handover start message is completed.

4. The data forwarding controller according to claim 1, wherein said control section is configured to delete, based on a MAC address of an old access point contained in a handover end message received from said mobile node, an entry setting a port to which said old access point is connected, as an output port corresponding to said MAC address of said mobile node, from said MAC learning table.

5. The data forwarding controller according to claim 1, wherein said control section is configured to receive data from access points performing data forward to said mobile node, and set an entry in MAC learning table corresponding to output ports for MAC addresses of said access points, based on said data.

6. A data communication system comprising a communication terminal apparatus of a mobile type which performs data transmission/reception via a network and which changes access points based on data receiving conditions, and a data forwarding controller which performs data forwarding control via said network,
wherein said communication terminal apparatus is configured to acquire a MAC address of a next access point to which said communication terminal apparatus is scheduled to be connected next, and broadcast a handover start message containing said MAC address of said acquired next access point;
said data forwarding controller is configured to set an entry in a MAC learning table as an additional entry based on said MAC address of said next access point contained in said handover start message received from said communication terminal apparatus, wherein said entry sets a port to which said next access point is connected, as an output port corresponding to a MAC address of said communication terminal apparatus; and
output data addressed to said MAC address of said communication terminal apparatus received via said network, in parallel to output ports listed in a plurality of entries as to said MAC address of said communication terminal apparatus set in said MAC learning table, wherein said output ports are a plurality of ports to which a current access point and said next access point of said communication terminal apparatus are connected.

7. The data communication system according to claim 6, wherein said communication terminal apparatus is configured to perform a handover process on condition that said communication terminal apparatus receives a handover setting completion message from said data forwarding controller as a response to said handover start message.

8. The data communication system according to claim 6, wherein said data forwarding controller is configured to transmit a handover setting completion message to said communication terminal apparatus from which said handover start message is received, on condition that said setting of said additional entry in said MAC learning table based on said handover start message is completed.

9. The data communication system according to claim 6, wherein said data forwarding controller is configured to delete, based on a MAC address of an old access point contained in a handover end message received from said communication terminal apparatus, an entry setting a port to which said old access point is connected, as an output port corresponding to said MAC address of said communication terminal apparatus, from said MAC learning table.

10. A method of controlling data forwarding via a network, comprising the steps of:
(a) setting, for a mobile node, in a MAC learning table in which a MAC address of data for forwarding is associated with an output port, a plurality of entries associating different output ports with a MAC address of said mobile node; and
(b) outputting data addressed to said MAC address of said mobile node received via said network, to said plurality of output ports in parallel based on said plurality of entries set in said MAC learning table,
wherein said step (a) comprises setting an entry in said MAC learning table as an additional entry based on a MAC address of a next access point contained in a handover start message received from said mobile node, wherein said additional entry sets a port to which said next access point is connected, as an output port corresponding to said MAC address of said mobile node; and said step (b) comprises outputting said data addressed to said MAC address of said mobile node received via said network, in parallel to said output ports listed in said plurality of entries as to said MAC address of said mobile node set in said MAC learning table, wherein said output ports are a plurality of ports to which a current access point and said next access point of said mobile node are connected.

11. The method according to claim 10, wherein said step (a) comprises setting a plurality of entries respectively setting a port to which a current access point of said mobile node is connected and port(s) to which one or more next access points of said mobile node is connected, as output ports corresponding to said MAC address of said mobile node; and said step (b) comprises outputting said data addressed to said MAC address of said mobile node received via said network, to said plurality of output ports set in said plurality of entries in parallel.

12. The method according to claim 10, further comprising the step of:
transmitting a handover setting completion message to said mobile node from which said handover start message is received, on condition that said setting of said additional entry in said MAC learning table based on said handover start message is completed.

13. The method according to claim 10, further comprising the step of:
deleting, based on a MAC address of an old access point contained in a handover end message received from said mobile node, an entry setting a port to which said old access point is connected, as an output port corresponding to said MAC address of said mobile node, from said MAC learning table.

14. The method according to claim 10, further comprising the step of:

receiving data from access points performing data forwarding to said mobile node, and setting an entry corresponding to output ports for MAC addresses of said access points in said MAC learning table, based on said data.

15. A data communication method comprising a communication terminal apparatus of a mobile type which performs data transmission/reception via a network and which changes access points based on data receiving conditions, and a data forwarding controller which performs data forwarding control via said network, wherein said communication terminal apparatus acquires a MAC address of a next access point to which said communication terminal apparatus is scheduled to be connected next, and broadcasts a handover start message containing said MAC address of said acquired next access point;

said data forwarding controller sets an entry in a MAC learning table as an additional entry based on said MAC address of said next access point contained in said handover start message received from said communication terminal apparatus, wherein said additional entry sets a port to which said next access point is connected, as an output port corresponding to a MAC address of said communication terminal apparatus; and outputs data addressed to said MAC address of said communication terminal apparatus received via said network, in parallel to output ports listed in a plurality of entries as to said MAC address of said communication terminal apparatus set in said MAC learning table, wherein said output ports are a plurality of ports to which a current access point and said next access point of said communication terminal apparatus are connected.

16. The data communication method according to claim 15, wherein said communication terminal apparatus further performs a handover process on condition that said communication terminal apparatus receives a handover setting completion message from said data forwarding controller as a response to said handover start message.

17. The data communication method according to claim 15, wherein said data forwarding controller further transmits a handover setting completion message to said communication terminal apparatus from which said handover start message is received, on condition that said setting of said additional entry in said MAC learning table based on said handover start message is completed.

18. The data communication method according to claim 15, wherein said data forwarding controller further deletes, based on a MAC address of an old access point contained in a handover end message received from said communication terminal apparatus, an entry setting a port to which said old access point is connected, as an output port corresponding to said MAC address of said communication terminal apparatus, from said MAC learning table.

19. A computer readable medium including computer executable instructions, wherein the instructions, when executed by a processor, cause the processor to perform a method for executing a data forwarding controlling process via a network on a computer system, said method comprising the steps of:

setting, for a mobile node, in a MAC learning table in which a MAC address of data for forwarding is associated with an output port, a plurality of entries associating different output ports with a MAC address of said mobile node; and outputting data addressed to said MAC address of said mobile node received via said network, to said plurality of output ports in parallel based on said plurality of entries set in said MAC learning table, wherein said step setting includes setting an entry in said MAC learning table as an additional entry based on a MAC address of a next access point contained in a handover start message received from said mobile node, wherein said additional entry sets a port to which said next access point is connected, as an output port corresponding to said MAC address of said mobile node; and said outputting data includes outputting said data addressed to said MAC address of said mobile node received via said network, in parallel to said output ports listed in said plurality of entries as to said MAC address of said mobile node set in said MAC learning table, wherein said output ports are a plurality of ports to which a current access point and said next access point of said mobile node are connected.

* * * * *